United States Patent
Ruiz

(10) Patent No.: US 8,706,816 B2
(45) Date of Patent: Apr. 22, 2014

(54) SYSTEM AND METHOD FOR EMAIL DELIVERY FOR SHARED DOMAIN NAME

(75) Inventor: Tim Ruiz, Cedar Rapids, IA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 2093 days.

(21) Appl. No.: 11/160,462

(22) Filed: Jun. 24, 2005

(65) Prior Publication Data

US 2005/0216567 A1   Sep. 29, 2005

(51) Int. Cl.
*G06F 15/16* (2006.01)

(52) U.S. Cl.
USPC ............ 709/206; 709/200; 709/245; 370/352

(58) Field of Classification Search
USPC ............................. 709/206, 200, 245; 370/352
See application file for complete search history.

(56) References Cited

U.S. PATENT DOCUMENTS

| | | | |
|---|---|---|---|
| 5,774,660 A | 6/1998 | Brendel et al. | |
| 5,944,790 A | 8/1999 | Levy | |
| 5,999,912 A | 12/1999 | Wodarz et al. | |
| 6,003,030 A | 12/1999 | Kenner et al. | |
| 6,134,588 A | 10/2000 | Guenthner et al. | |
| 6,151,631 A | 11/2000 | Ansell et al. | |
| 6,304,913 B1 | 10/2001 | Rune | |
| 6,351,743 B1 | 2/2002 | DeArdo et al. | |
| 6,353,849 B1 | 3/2002 | Linsk | |
| 6,598,077 B2 | 7/2003 | Primak et al. | |
| 6,606,643 B1 | 8/2003 | Emens et al. | |
| 6,629,136 B1 | 9/2003 | Naidoo | |
| 6,757,740 B1 | 6/2004 | Parekh et al. | |
| 6,829,230 B1 | 12/2004 | Tiuri | |
| 7,139,840 B1 * | 11/2006 | O'Toole | 709/245 |
| 7,155,484 B2 * | 12/2006 | Malik | 709/206 |
| 7,428,576 B2 * | 9/2008 | Shuster | 709/206 |
| 8,291,024 B1 * | 10/2012 | Cheng et al. | 709/206 |
| 8,572,227 B2 * | 10/2013 | Toomey et al. | 709/223 |
| 2001/0053999 A1 | 12/2001 | Feinberg | |
| 2002/0023135 A1 * | 2/2002 | Shuster | 709/206 |
| 2002/0073235 A1 | 6/2002 | Chen et al. | |
| 2002/0138580 A1 * | 9/2002 | Al-Kazily et al. | 709/206 |
| 2002/0147790 A1 | 10/2002 | Snow | |
| 2003/0009594 A1 | 1/2003 | McElligott | |
| 2003/0037131 A1 | 2/2003 | Verma | |
| 2003/0069991 A1 | 4/2003 | Brescia | |
| 2003/0081591 A1 * | 5/2003 | Cheung et al. | 370/352 |
| 2003/0101278 A1 | 5/2003 | Garcia-Luna-Aceves et al. | |
| 2004/0006597 A1 | 1/2004 | Hughes | |
| 2004/0078490 A1 | 4/2004 | Anderson et al. | |
| 2004/0083307 A1 | 4/2004 | Uysal | |
| 2004/0102197 A1 | 5/2004 | Dietz | |

(Continued)

OTHER PUBLICATIONS

Cisco Systems, Inc. CSS Advanced Configuration Guide (Software Version 6.10). Downloaded from http://www.cisco.com/univercd/cc/td/doc/product/webscale/css/css_610/advcggd/proximty.pdf on Mar. 23, 2006.
WorldWide Scrabble front page. Downloaded from http://www.scrabble.com/ on Mar. 23, 2006.
Alternatives to Domain Names. Downloaded from http://cyber.law.harvard.edu/property00/domain/alternatives.html on Mar. 23, 2006.

(Continued)

*Primary Examiner* — Thu Ha Nguyen
(74) *Attorney, Agent, or Firm* — Karl A. Fazio

(57) ABSTRACT

Systems and methods of the present invention allow for delivery of email messages to email addresses associated with the shared domain names. A Routing Mail Server may determine a network address or a geographical location of a Sender and forward email message to a Recipient associated with that network address or geographical location.

10 Claims, 8 Drawing Sheets

(56) References Cited

U.S. PATENT DOCUMENTS

| | | | |
|---|---|---|---|
| 2005/0063401 A1 | 3/2005 | Kenner et al. | |
| 2005/0111384 A1 | 5/2005 | Ishihara et al. | |
| 2005/0216567 A1* | 9/2005 | Ruiz | 709/206 |
| 2005/0283503 A1* | 12/2005 | Hancock et al. | 707/200 |
| 2006/0020667 A1* | 1/2006 | Wang et al. | 709/206 |
| 2006/0184640 A1 | 8/2006 | Hatch | |
| 2006/0235972 A1 | 10/2006 | Asnis | |
| 2009/0063551 A1* | 3/2009 | Shuster | 707/102 |
| 2009/0182884 A1 | 7/2009 | Datta et al. | |
| 2010/0217837 A1* | 8/2010 | Ansari et al. | 709/218 |
| 2010/0250512 A1* | 9/2010 | Miller et al. | 707/706 |

OTHER PUBLICATIONS

Aug. 30, 2011 office action in related U.S. Appl. No. 11/160,460.

Nov. 16, 2011 response to Aug. 30, 2011 office action in related U.S. Appl. No. 11/160,460.

Padamanabban, Venkata, et al. Determining the Geographic Location of Internet Hosts [Online]. Jun. 2001 [Retrieved on Oct. 2, 2008] ACM. ACM Sigmetrics Performance Evaluation Review.

Brain, Marshall. How Domain Name Servers Work [Online]. Retrieved from: http://web.archive.org/web/20020223193850/www.howstuffworks.com/dns.htm/printable. Feb. 23, 2002.

Internet Practice Solutions—Domain Registration Services [Online], Apr. 4, 2001.

* cited by examiner

SYSTEM AND METHOD FOR EMAIL DELIVERY FOR SHARED DOMAIN NAME

CROSS REFERENCE TO RELATED PATENT APPLICATIONS

This patent application is related to the following patent application concurrently filed herewith, all assigned to The Go Daddy Group, Inc:

U.S. patent application Ser. No. 11/160,445, "RESOLVING ACCESS TO CONTENT ASSOCIATED WITH SHARED DOMAIN NAME USING ROUTING DNS."

U.S. patent application Ser. No. 11/160,458, "RESOLVING ACCESS TO CONTENT ASSOCIATED WITH SHARED DOMAIN NAME USING TOGGLING CONTENT SERVER."

U.S. patent application Ser. No. 11/160,460, "RESOLVING ACCESS TO CONTENT ASSOCIATED WITH SHARED DOMAIN NAME USING ROUTING WEBSITE."

FIELD OF THE INVENTION

The present invention relates in general to electronic mail systems and methods and in particular to forwarding of email messages addressed to a recipient associated with a shared domain name.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding webpages on the Internet is generally known as the World Wide Web (WWW) or simply web.

Websites may be created using HyperText Markup Language (HTML). The HTML tags define how the webpages for the website are to be displayed. Users of the Internet may access content providers' websites using software known as a Web browser, such as MICROSOFT INTERNET EXPLORER or NETSCAPE NAVIGATOR. After the browser has located the desired webpage, it requests and receives information from the webpage, typically in the form of an HTML document, and then displays the webpage content for the user. The user may then view other webpages at the same website or move to an entirely different website using the browser.

Browsers are able to locate specific websites because each website, resource and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other, e.g. 64.202.167.32. The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon, for example 2EDC:BA98:0332:0000:CF8A:000C:2154:7313.

However, IP addresses, even in human readable notation, are difficult to remember and use by people. Uniform Resource Locators (URL) are much easier to remember and may be used to point to any website, directory or file on the Internet. A browser is able to access a website on the Internet through the use of a URL. The URL may include a Hypertext Transfer Protocol (HTTP) request combined with the website's Internet address, also known as the website's domain name. An example of a URL with an HTTP request and domain name is: http://godaddy.com. In this example, the "http" identifies the URL as an HTTP request and "godaddy.com" is the domain name.

Individuals, companies, and other entities that provide content on the web generally want to use their name or one of their trademarks as part of their domain name. Thus, domain names are generally company trademarks, personal names or short phrases concatenated with a top level domain name (TLD) extension (e.g. .com, .net, .org, .biz, .us, .cc, .ws, .de, etc.). TLD extensions can be divided into two groups. The first group is known as generic Top-Level Domains (gTLD) and the second group is country code TLDs (ccTLD). Examples of gTLDs include .com, .net, .org, .biz, etc. Examples of current ccTLDs are: .us for the United States, .uk and .gb for United Kingdom, .ca for Canada, .de for Germany, .jp for Japan, etc.

Domain names are much easier to remember and use than their corresponding IP addresses. The Internet Corporation for Assigned Names and Numbers (ICANN) approves some gTLDs and delegates the responsibility to a particular organization (hereinafter registry) for maintaining an authoritative source for the registered domain names within a TLD and their corresponding IP addresses. For certain TLDs, e.g. .biz, .info, .name, and now .org, the registry is also the authoritative source for contact information related to the domain name and is referred to as a "thick" registry. For other TLDs, e.g. .com, .net, only the domain name and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org and some other registries allows a customer to use an ICANN-accredited registrar. For example, if a customer, John Doe, wishes to register the domain name "JohnDoe.com", John Doe may initially determine whether the desired domain name is available by contacting a registrar. The customer may make this contact using the registrar's webpage and typing the desired domain name into a field on the registrar's webpage created for this purpose. Upon receiving the request from the customer, the registrar may ascertain whether "JohnDoe.com" has already been registered by checking the SRS database of the registry associated with the TLD of the domain name. The results of the search may then be displayed on the webpage to thereby notify the customer of the availability of the domain name. If the domain name is available, the customer may proceed with the registration process. Otherwise, the customer may keep selecting alternative domain names until an available domain name is found.

Domain names are typically registered for a period of one to ten years. If the registrant does not renew the domain name, it will expire. Shortly after the domain name goes past its expiration date the domain name will be deactivated. All domain services including the webpage and email will no longer work. For approximately 40 days the domain name will be in a "grace period". During this time the domain name will not be active and may be renewed without paying any additional fees. At the end of the grace period the domain name will enter a 30-day redemption period. WHOIS information (name, address, telephone numbers, etc.) will be deleted from the registry. The domain name may be renewed by its original owner for a fee during the redemption period. Five days after the end of the redemption period the domain name will be deleted from the registry and will be made available for anyone to register.

Each website owner prefers that his domain name is easy to remember and type into a web browser. Generally, the shorter the domain name, the more desirable it is. Domain names consisting of a single word or abbreviation are most desirable. Domain names consisting of multiple words, having digits or hyphens are less desirable. Also domain names in some TLDs are more desirable than names in other TLDs; thus, .com is the oldest TLD for businesses and currently the most desirable.

The Domain Name System (DNS) is a distributed database that allows browsers, search engines and other Internet applications to determine an IP address for any of the domain names stored in the DNS. A registrant may select authoritative name servers for the registrant's domain name and provide them to the registering registrar. The authoritative name servers store the information necessary to find the name servers that store the IP address for the domain name. The registrar may store the authoritative name servers for the domain name in the WHOIS database.

The registry for the domain name may access the authoritative name servers, determine the name servers and store the name servers in the DNS root servers. The name servers may either provide the IP address of the domain name or provide the address to yet another name server. Occasionally, several levels of name servers may have to be searched before reaching a name server that has the IP address of the domain name.

The name servers for the domain name may be operated by the registrant, the registrar, a hosting provider, or another party. The structure of the DNS database gives the registrant or the registrant's hosting provider a great deal of flexibility in assigning, controlling and updating the IP address for the domain name.

Currently, domain names have a global effect. Accessing a website from anywhere in the world is likely to produce the same or similar webpage on users' web browsers. However, many businesses have a limited area of operation and don't necessarily need world-wide exposure. Therefore, new systems and methods are needed to allow the sharing of domain names and provide access to the websites associated with the shared domain names.

Similarly, email addresses associated with domain names have global effect. Sending an email message from anywhere in the world to an email account would result in the delivery of this email to the same entity. Therefore, new systems and methods are needed to allow the sharing of domain names and provide delivery of email messages to email accounts associated with shared domain names.

SUMMARY OF THE INVENTION

The limitations cited above and others are substantially overcome through the systems and methods disclosed herein. The systems and methods of the present invention allow for sharing domain names based on businesses' geographical locations and accessing content located on computer network resources associated with the shared domain names. The content associated with the shared domain names may include websites/webpages, FTP (File Transfer Protocol) resources, etc. Further, the systems and methods of the present invention allow for delivery of email messages to the email addresses associated with the shared domain names.

A sample embodiment of the invention discloses a system for providing access to the content associated with a shared domain name. The system may include a series of domain name servers, two or more Content Providers, two or more Servers maintained by the corresponding Content Providers, and one or more Requesters accessing the content located on the Servers.

Typically, the series of domain name servers may comprise a Root DNS, a Top Level DNS, and a Routing DNS. The Root DNS may provide network addresses (e.g. name servers) for the Top Level DNS. The Top Level DNS may provide network addresses for the Routing DNS.

The Content Providers may be multiple parties sharing control or ownership of the domain name. Typically, each Content Provider may produce content for online resources targeting the audience located within the geographical area of operation served by the Content Provider.

The Servers are computing means for storing data online (e.g. content of the webpages, files available for FTP, etc.). Each Server associated with a different Content Provider preferably has a different network address (e.g. IP address). Thus, when the Requester tries to access content located on computer network resources associated with the shared domain name, the Routing DNS may determine the geographical location of the Requester from its IP address and return a network address (e.g. IP address) of the Server associated with that geographical location.

The system may further comprise a Database, which associates network addresses (e.g. IP addresses) with geographical locations and Content Providers with geographical locations. In a more generalized scenario, the Content Providers may be associated with network addresses or blocks (intervals) of network addresses.

In an alternative sample embodiment, a system may include a Toggling Content Server controlled by two or more Content Providers, one or more Requesters accessing the Toggling Content Server associated with a shared domain name, and two or more Contents produced by the corresponding Content Providers.

When the Requester accesses the Toggling Content Server, the Toggling Content Server may determine the geographical location of the Requester and serve a Content associated with that geographical location to the Requester.

In yet another sample embodiment, a system may include a Routing Website controlled by two or more Content Providers, two or more Websites maintained by corresponding Content Providers, and one or more Requesters accessing the Routing Website associated with a shared domain name.

When the Requester accesses the Routing Website, the Routing Website may determine the geographical location of the Requester and forward the Requester to a Website (a URL) associated with that geographical location.

A sample system for delivering email messages to email addresses associated with shared domain names may comprise one or more Senders, one or more Recipients, and a Routing Mail Server. The Routing Mail Server may determine the geographical location of the Sender and route the email messages to the Recipient associated with that geographical location.

Optionally, the system may further comprise a Database for saving associations between the network addresses (IP addresses) and geographical locations and associations between Recipients and geographical locations. In a more generalized scenario Recipients may be associated with network addresses (IP addresses) or blocks (intervals) of network addresses.

The systems and methods of the present invention allow for sharing domain names based on the businesses' geographical locations and help provide accessibility to the content associated with the shared domain names and allow delivery of the email messages to the email addresses associated with the shared domain names.

The above features and advantages of the present invention will be better understood from the following detailed description taken in conjunction with the accompanying drawings.

DETAILED DESCRIPTION AND PREFERRED EMBODIMENT

Figure 1:
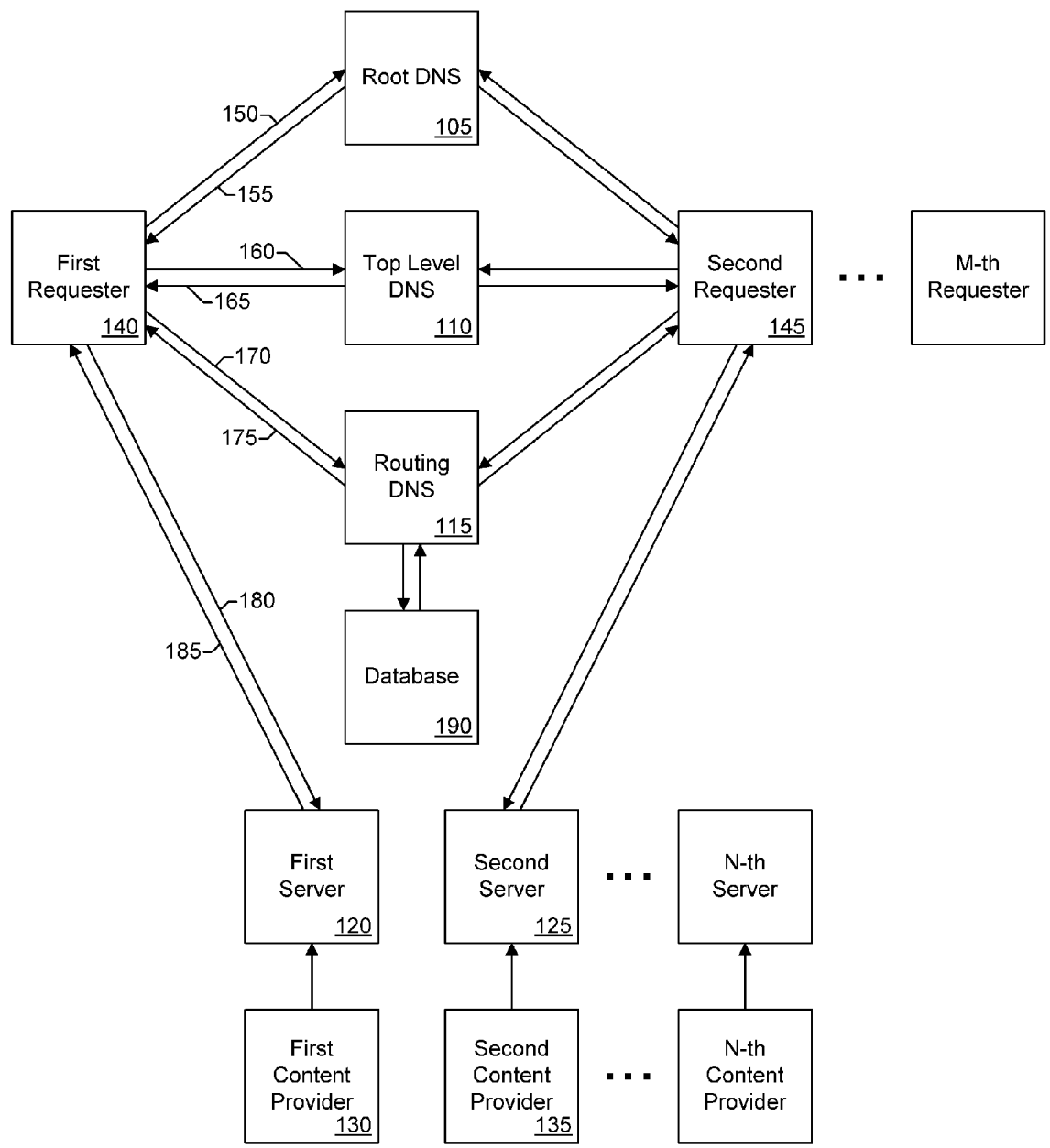
FIG. 1 is a block diagram illustrating a sample embodiment of the system of the present invention for accessing content associated with a shared domain name using a Routing DNS.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

Referring to FIG. 1, a plurality of Requesters (a First Requester 140, a Second Requester 145, . . . , an M-th Requester) may be computer programs or devices operated automatically or by persons on a computer network. The computer network may be a global computer network, such as the Internet. The Requesters may request DNS records for a domain name from a plurality of domain name servers. The plurality of domain name servers may include three tiers. The first tier is a Root DNS 105, the second tier is a Top Level DNS 110, and the third tier is a Routing DNS 115. The Root DNS 105 may return network addresses for the Top Level DNS 110, and in turn the Top Level DNS 110 may return network addresses for the Routing DNS 115. The network addresses for domain name servers may include name server addresses and/or IP addresses. Examples of name server and IP addresses are A.GTLD-SERVERS.NET and 192.5.6.30, respectively.

The First Requester 140 may request DNS records from the plurality of domain name servers through Communication Links 150, 155, 160, 165, 170, and 175. The Communication Links 150, 155, 160, 165, 170, and 175 are pathways for transmitting data over the computer network.

The Routing DNS 115 may determine geographical location of the Requester and return to the Requester a network address (e.g. IP address) of a First Server 120, a Second Server 125, . . . , or a N-th Server. Each Server may be associated with a particular geographical area and maintained by a corresponding Content Provider, a First Content Provider 130, a Second Content Provider 135, . . . , an N-th Content Provider. The Content Providers may produce content for the Servers targeting the audience located within the geographical area of operation served by the Content Provider.

After the First Requester 140 receives the network address of the corresponding Server, e.g. the First Server 120, the First Requester may request content from the server via communication links 180 and 185. The Communication Links 180 and 185 are pathways for transmitting data over the computer network.

Similarly when the Second Requester 145 from another geographical location requests content from a resource associated with the same domain name, the Routing DNS 115 may provide a network address of the Second Server 125 to the Second Requester 145. Then, the Second Requester 145 may obtain content from the Second Server 125.

Thus, when Requesters, located in different geographical areas, access content located on computer network resources associated with the shared domain name, they will be directed to different Servers and the content presented to them is likely to be different.

Further the system may also include a Database 190 that is accessible by the Routing DNS 115. The Database 190 may store associations between geographical areas and network addresses or blocks of network addresses. The Routing DNS 115 may determine the geographical location of the Requester by determining its network address and finding the geographical location for its network address in the Database 190.

Further the Database 190 may contain records associating each geographical location with the Content Provider and corresponding Server.

Alternatively, the Database 190 may contain records associating network addresses or blocks of network addresses with the Content Provider and corresponding Server. Thereby, alleviating the need for using geographical locations.

If the Routing DNS 115 cannot determine the Requester's network address or geographical location, or if there is no Content Provider associated with the Requester's network address or geographical location, the Routing DNS 115 may serve the Requester with a network address of a Server randomly selected from all Servers associated with the shared domain name. Alternatively, the Routing DNS 115 may serve the Requester with a network address of a Server that hosts a resource showing the list of all Content Providers associated with the shared domain name and, optionally, their geographical area of operation.

Figure 2:
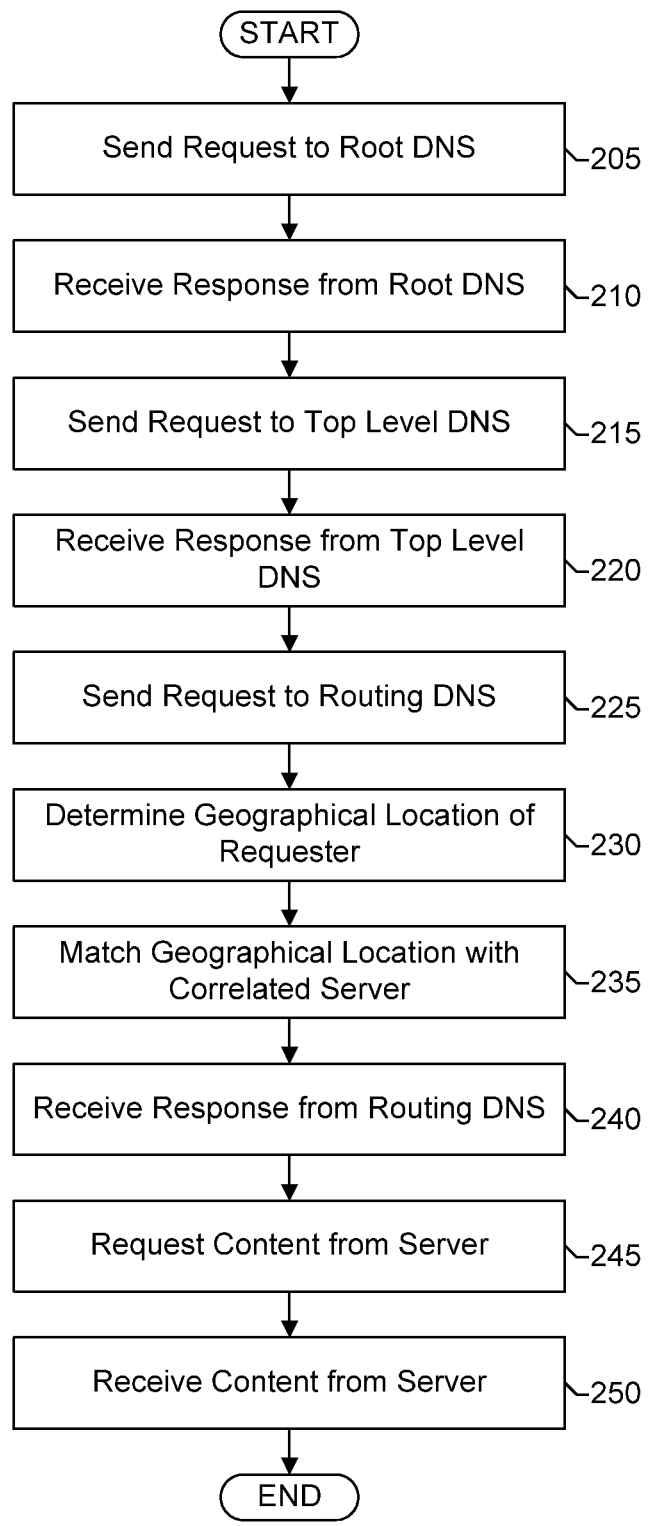
FIG. 2 represents a flowchart illustrating a method of using the system of FIG. 1.

Referring to FIG. 2, the method of using the system described above may comprise the following steps. A Requester may send a request to a Root DNS (Step 205). In its request, the Requester may inquire about the DNS records for a domain name. The Root DNS may respond and the Requester may receive a response from the Root DNS (Step 210). The response from the Root DNS may contain a network address of a Top Level DNS. Then, the Requester may send a request to the Top Level DNS (Step 215) and receive a response from the Top Level DNS (Step 220). The response from the Top Level DNS may contain a network address of a Routing DNS.

Further, the Requester may send a request to the Routing DNS (Step 225). The Routing DNS may determine the geographical location of the Requester (Step 230) and match the Requester's geographical location with a corresponding Server (Step 235). The Routing DNS may, then, respond to the Requester with the network address of the corresponding Server and the Requester receives the response (Step 240).

The Requester may request content from the corresponding Server (Step 245). The corresponding Server may provide the content to the Requester and the Requester may receive it (Step 250).

In a typical environment, the Requester does not have to request the DNS records of the domain name from the Root DNS, the Top Level DNS, and the Routing DNS every time the Requester accesses content of the resource associated with the domain name. The DNS records may be cached by the Requester or intermediate parties for fast access. Typically cached records need to be renewed after the records' time to live (TTL) has expired.

Figure 3:
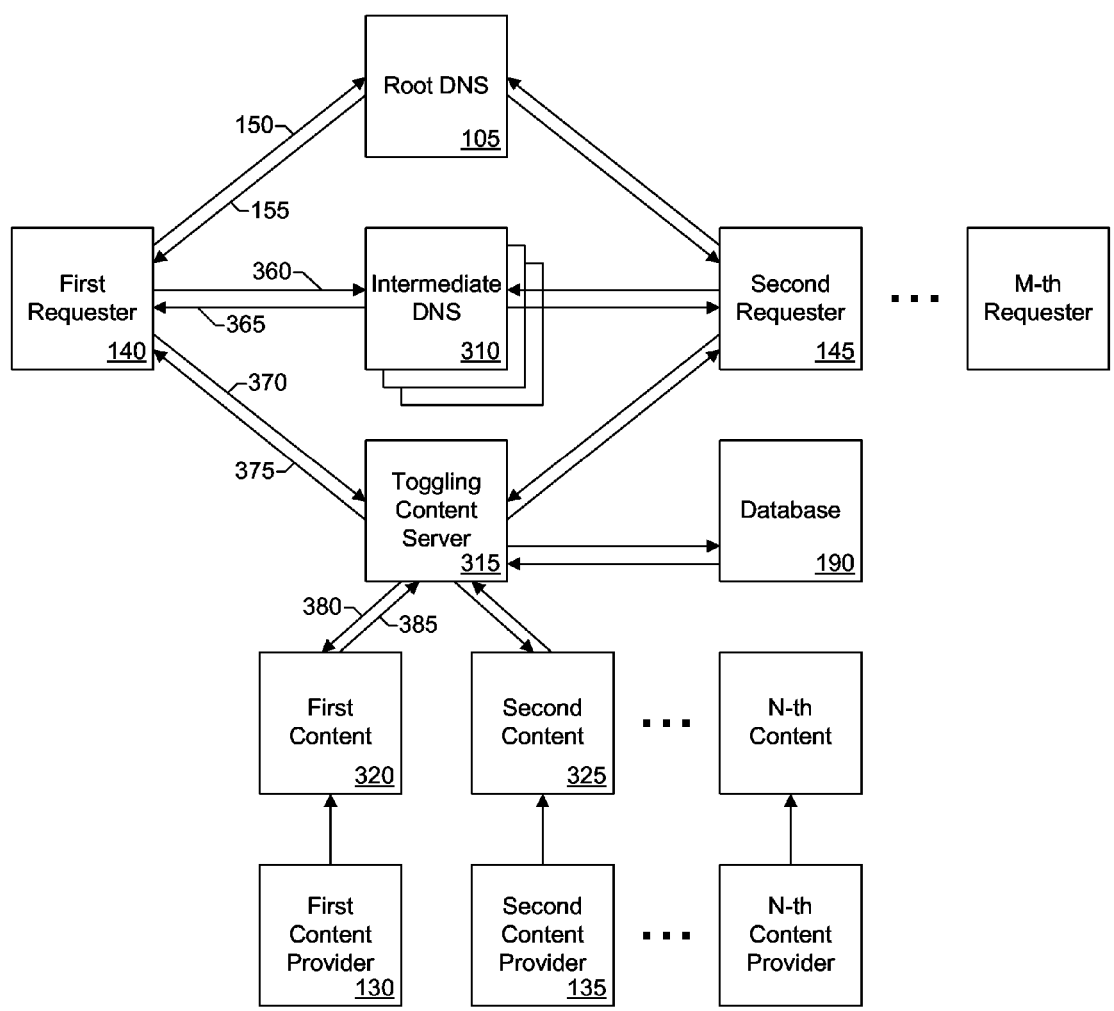
FIG. 3 is a block diagram illustrating a sample embodiment of the system of the present invention for accessing content associated with a shared domain name using a Toggling Content Server.

In an alternative embodiment of the present invention, shown in FIG. 3, a plurality of Requesters (a First Requester 140, a Second Requester 145, . . . , an M-th Requester) may request DNS records for a domain name from a plurality of domain name servers. The plurality of domain name servers may include multiple tiers. The first tier may be a Root DNS 105. Other tiers in the plurality of domain name servers are represented by an Intermediate DNS 310. The system may include multiple Intermediate DNS. The Intermediate DNS 310 may be Top Level, Domain Level, or Subdomain Level DNS, etc.

The Root DNS 105 may return network addresses for the Intermediate DNS 310 (e.g. Top Level DNS). The Intermediate DNS 310, in turn, may return network addresses for the domain name servers lower in the chain of domain name servers or network addresses for a Toggling Content Server 315.

The First Requester 140 may request DNS records from the plurality of domain name servers through Communication Links 150, 155, 360, and 365. The Communication Links 150, 155, 360, and 365 are pathways for transmitting data over the computer network. The last Intermediate DNS 310 in the chain of DNS may provide network address(es) of the Toggling Content Server 315 to the First Requester 140. The First Requester 140, then, may obtain content from the Toggling Content Server 315 via Communication Links 370 and 375. The Communication Links 370 and 375 are pathways for transmitting data over the computer network.

The Toggling Content Server 315 may determine the geographical location of the Requesters and serve to the Requesters Content from a plurality of Contents. The plurality of Contents may include a First Content 320, a Second Content 325, . . . , and a N-th Content. Each Content is associated with a particular geographical area and maintained by a corresponding Content Provider, a First Content Provider 130, a Second Content Provider 135, . . . , an N-th Content Provider. The Content Providers may produce the Content targeting the audience located within the geographical area of operation served by the Content Provider.

After the Toggling Content Server 315 has determined the geographical location of the First Requester 140, it determines the Content corresponding to this geographical location (e.g. the First Content 320) and obtains it via data transmission pathways 380 and 385. Then, the Toggling Content Server 315 serves the First Content 320 to the First Requester 140.

Similarly when the Second Requester 145 from a second geographical location requests data from a resource associated with the same domain name, the Toggling Content Server 315 may serve the Second Content 325 to the Second Requester 145.

Thus, when Requesters, located in different geographical locations, access the Content located on computer network resources associated with the same domain name, they will be served with different Contents.

Further the system may comprise a Database 190 accessible by the Toggling Content Server 315. The Database 190 may store associations between geographical locations and network addresses (e.g. IP addresses or blocks of IP addresses). The Toggling Content Server 315 may determine the geographical location of the Requester by determining its network address and finding the geographical location for its network address in the Database 190.

Further the Database 190 may contain records associating each geographical location with the Content Provider and corresponding Content.

Alternatively, the Database 190 may contain records associating network addresses (IP addresses or blocks of IP addresses) with Content Provider and corresponding Content. Thereby, alleviating the need for using geographical locations.

If the Toggling Content Server 315 cannot determine the Requester's network address or geographical location, or if there is no Content Provider associated with Requester's network address or geographical location, the Toggling Content Server 315 may serve the Requester with Content randomly selected from all Contents associated with the shared domain name. Alternatively, the Toggling Content Server 315 may serve the Requester with a Content that shows the list of all Content Providers associated with the shared domain name and, optionally, their geographical area of operation.

Figure 4:
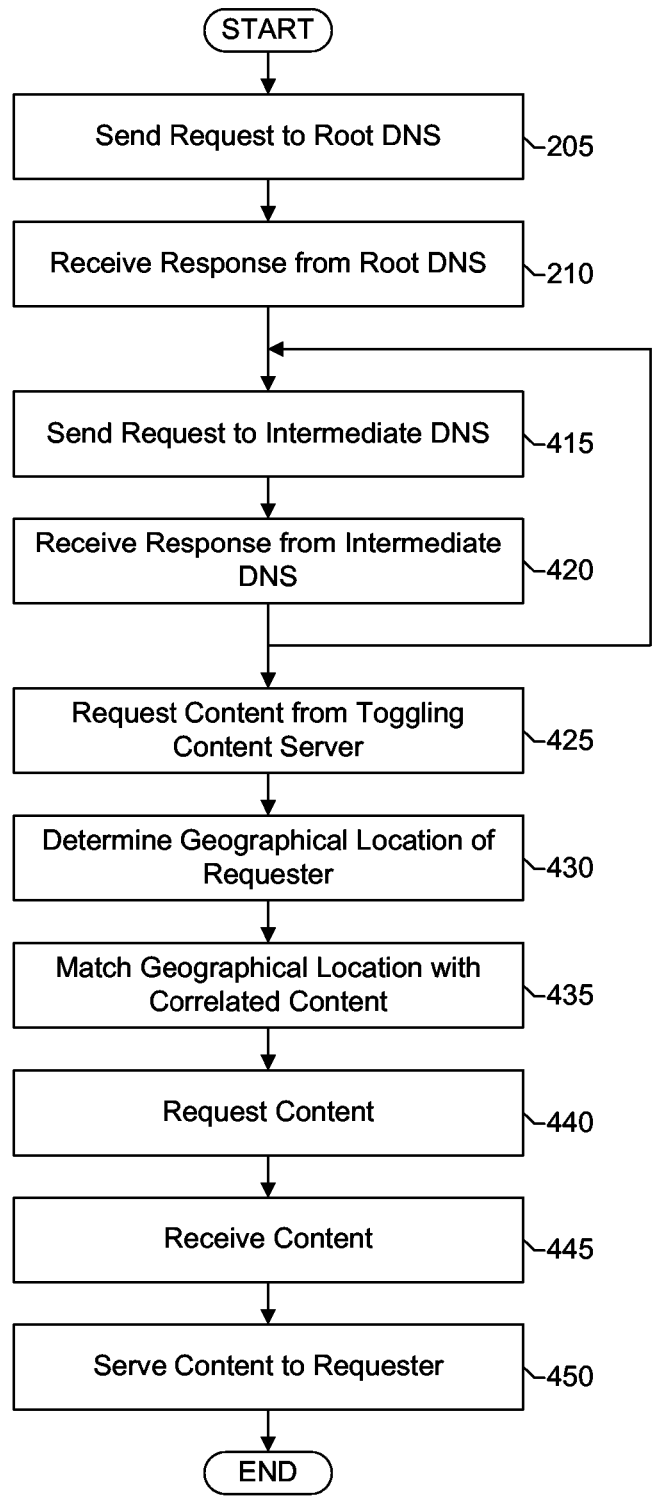
FIG. 4 represents a flowchart illustrating a method of using the system of FIG. 3.

Referring to FIG. 4, the method of using the system described in FIG. 3 may comprise the following steps. A Requester may send a request to a Root DNS (Step 205). In its request, the Requester may inquire about the DNS records for a domain name. The Root DNS may respond, and the Requester may receive a response from the Root DNS (Step 210). The response from the Root DNS may contain a network address of an Intermediate DNS. The Requester may send a request to the Intermediate DNS (Step 415) and receive a response from the Intermediate DNS (Step 420). The response from the Intermediate DNS may contain network address(es) of another Intermediate DNS down the line or network address(es) of a Toggling Content Server. If the response contains network address(es) of another Intermediate DNS, steps 415 and 420 may be repeated until the response contains network address(es) of the Toggling Content Server.

Further, the Requester may request Content from the Toggling Content Server (Step 425). The Toggling Content Server may determine the geographical location of the Requester (Step 430) and match the Requester's geographical location with a corresponding Content (Step 435). The Toggling Content Server may, then, request the corresponding Content from a storage location (Step 440) and receive the Content (Step 445). The Toggling Content Server may, then, serve the corresponding Content to the Requester (Step 450).

Figure 5:
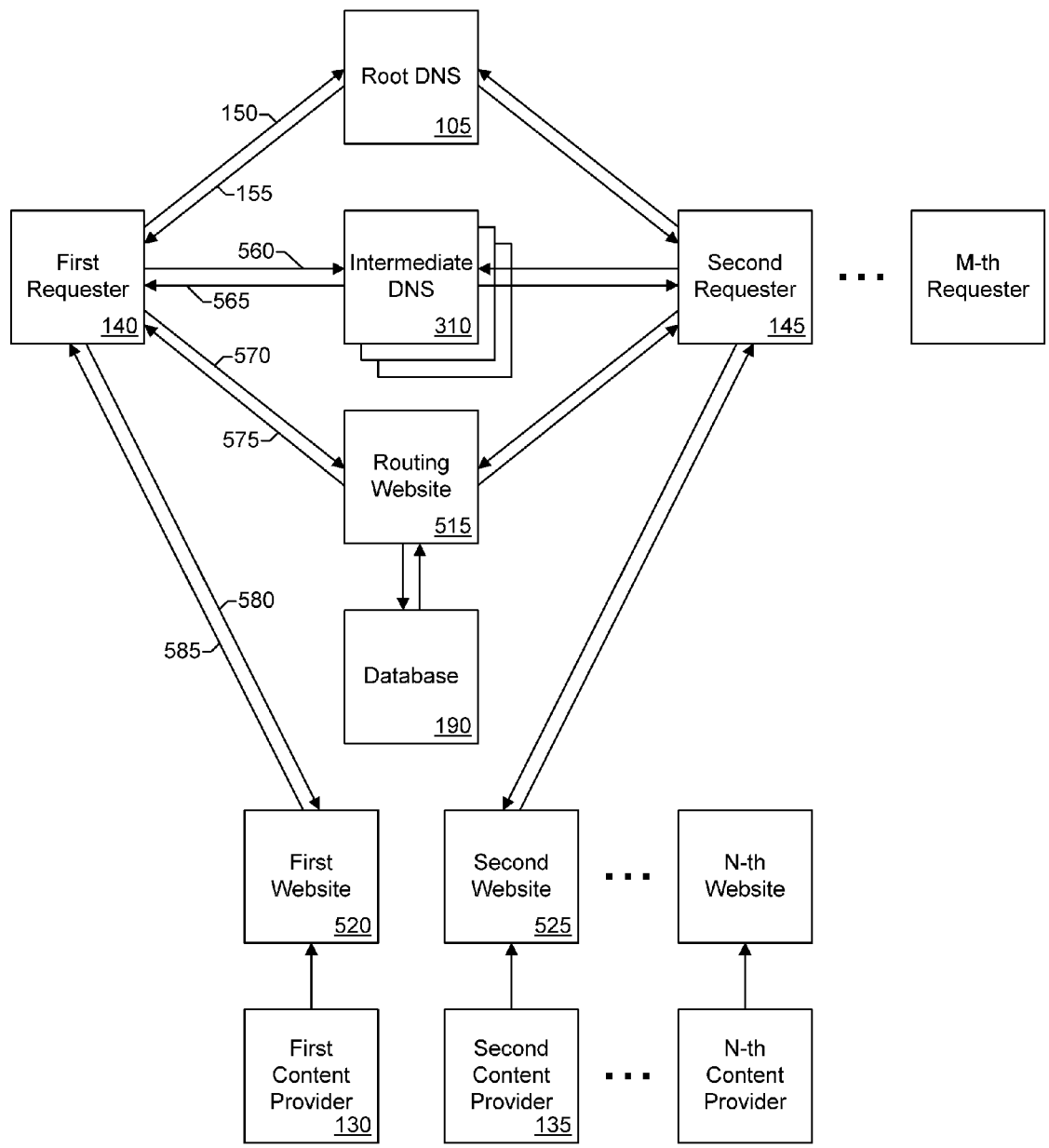
FIG. 5 is a block diagram illustrating a sample embodiment of the system of the present invention for accessing content associated with a shared domain name using a Routing Website for forwarding a Requester to a corresponding Website.

In another alternative embodiment of the present invention, depicted in FIG. 5, a plurality of Requesters (a First Requester 140, a Second Requester 145, . . . , an M-th Requester) may request DNS records for a domain name from a plurality of domain name servers. The plurality of domain name servers may include multiple tiers. The first tier may be a Root DNS 105. Other tiers in the plurality of domain name servers may be represented by an Intermediate DNS 310. The system may include multiple Intermediate DNS. The Intermediate DNS 310 may be Top Level, Domain Level, or Subdomain Level DNS, etc.

The Root DNS 105 may return network addresses for the Intermediate DNS 310 (e.g. Top Level DNS). The Intermediate DNS 310, in turn, may return network addresses for the domain name servers lower in the chain of domain name servers or network addresses for a Routing Website 515.

The First Requester 140 may request DNS records from the plurality of domain name servers through Communication Links 150, 155, 560, and 565. The Communication Links 150, 155, 560, and 565 are pathways for transmitting data over the computer network. The last Intermediate DNS 310 in the chain of DNS may provide network address(es) of a server that hosts the Routing Website 515 to the First Requester 140. The First Requester 140, then, may obtain content from the Routing Website 515 via Communication Links 570 and 575. The Communication Links 570 and 575 are pathways for transmitting data over the computer network.

The Routing Website 515 may determine a geographical location of the Requester and forward the Requester to a Website from a plurality of Websites. The plurality of Websites may include a First Websites 520, a Second Websites 525, . . . , and a N-th Websites. Each Websites may be associated with a particular geographical area and maintained by a corresponding Content Provider, a First Content Provider 130, a Second Content Provider 135, . . . , an N-th Content Provider. The Content Providers may produce content for the Websites targeting the audience located within the geographical area of operation served by the Content Provider.

After the Routing Website 515 has determined the geographical location of the First Requester 140, it determines a Website corresponding to that geographical location (e.g. the First Website 520) and serves a forwarding code to the First Requester 140.

The forwarding code may include a meta tag, a programming script (e.g. Java Script or Visual Basic Script), etc. Example of a meta tag that instructs a web browser to go to another page may look like this <meta http-equiv="refresh" content="0;URL=http://godaddy.com">.

The First Requester 140, then, obtains content of the First Website 520 via Communication Links 580 and 585. The Communication Links 580 and 585 are pathways for transmitting data over the computer network.

Similarly when the Second Requester 145 from another geographical location requests data from the Routing Website 515 associated with the same domain name, the Routing Website 515 may forward the Second Requester 145 to the Second Website 525.

Thus, when Requesters, located in different geographical locations, access an online resource using the same URL, they may be forwarded to different websites.

Further the system may comprise a Database 190 that is accessible by the Routing Website 515. The Database 190 may store associations between geographical locations and network addresses (e.g. IP addresses or blocks of IP addresses). The Routing Website 515 may determine the geographical location of the Requester by determining its network address (e.g. IP address) and finding the geographical location for its network address in the Database 190.

Further the Database 190 may contain records associating each geographical location with the Content Provider and corresponding Website URL.

Alternatively, the Database 190 may contain records associating network addresses (IP addresses or blocks of IP addresses) with the Content Provider and corresponding Website URL. Thereby, alleviating the need for using geographical locations.

If the Routing Website 515 cannot determine the Requester's network address or geographical location, or if there is no Content Provider associated with Requester's network address or geographical location, the Routing Website 515 may forward the Requester to the Website randomly selected from all Websites associated with the shared domain name. Alternatively, the Routing Website 515 may forward the Requester to a Website that shows the list of all Content Providers associated with the shared domain name and, optionally, their geographical area of operation.

Figure 6:
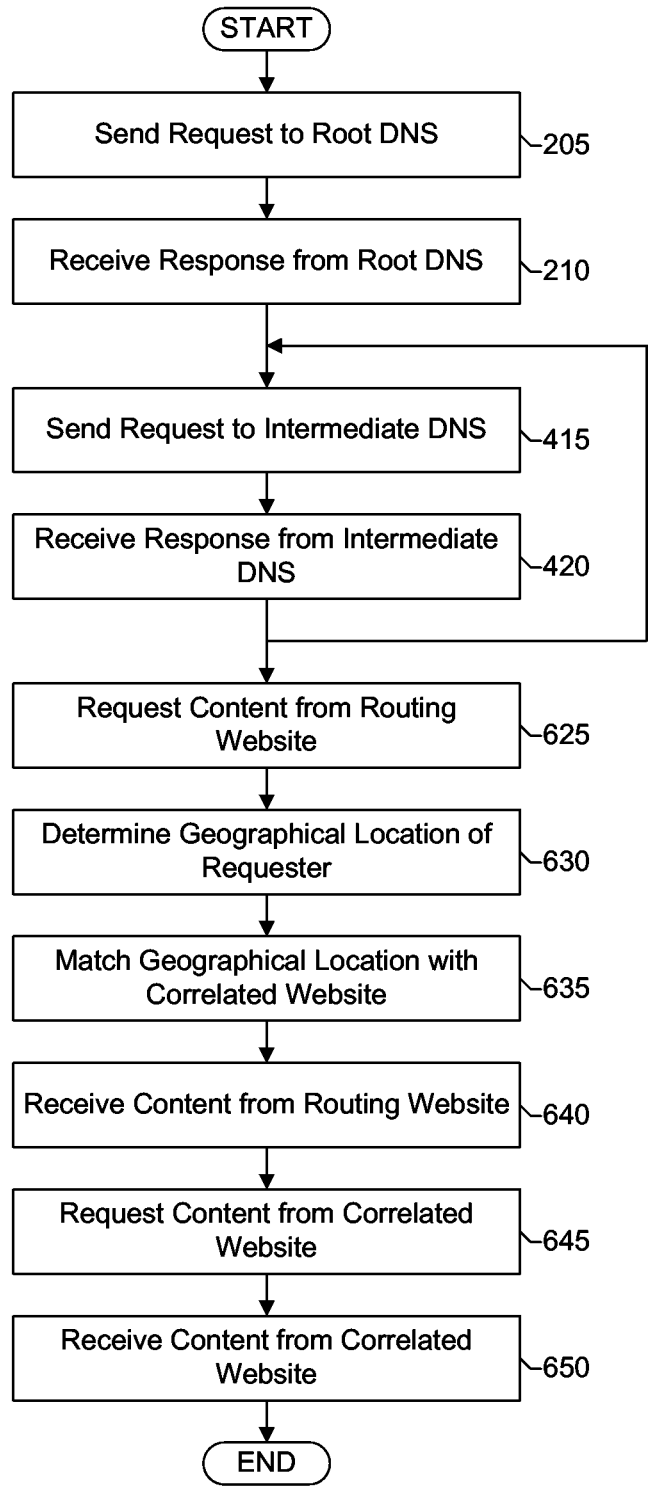
FIG. 6 represents a flowchart illustrating a method of using the system of FIG. 5.

Referring to FIG. 6, the method of using the system described in FIG. 5 may comprise the following steps. A Requester may send a request to a Root DNS (Step 205). In its request, the Requester may inquire about the DNS records for a domain name. The Root DNS may respond, and the Requester may receive a response from the Root DNS (Step 210). The response from the Root DNS may contain a network address of an Intermediate DNS. The Requester may send a request to the Intermediate DNS (Step 415) and receive a response from the Intermediate DNS (Step 420). The response from the Intermediate DNS may contain network address(es) of another Intermediate DNS down the line or network address(es) of a server hosting a Routing Website. If the response contains network address(es) of another Intermediate DNS, steps 415 and 420 may be repeated until the response contains network address(es) of a server hosting the Routing Website.

Further, the Requester may request content from the Routing Website (Step 625). The Routing Website may determine the geographical location of the Requester (Step 630) and match the Requester's geographical location with a corresponding Website (Step 635). The Routing Website may serve content to the Requester; the Requester may receive it (Step 640). The content from the Routing Website may contain a forwarding code to navigate the Requester to the corresponding Website. The Requester may request content from the corresponding Website (Step 645). The corresponding Website may provide the content to the Requester, and the Requester may receive it (Step 650).

Figure 7:
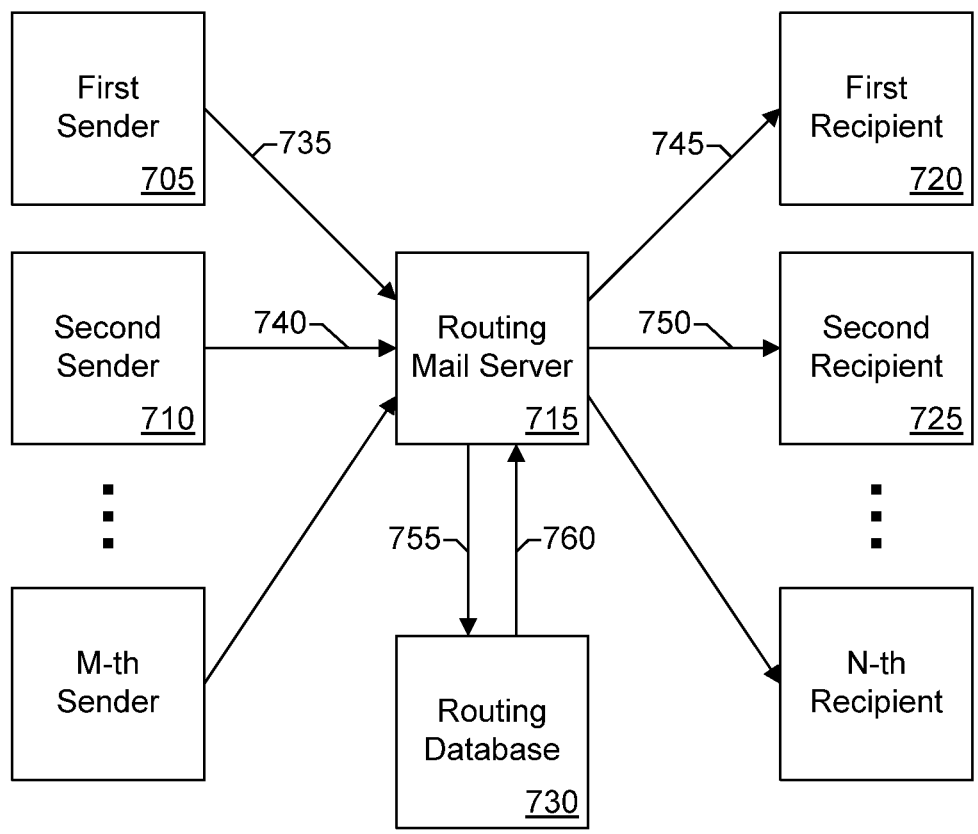
FIG. 7 is a block diagram illustrating a sample embodiment of the system of the present invention for delivering email messages to the email addresses associated with a shared domain name.

FIG. 7 demonstrates a sample embodiment of a system for delivering email messages to email addresses associated with a shared domain name. A plurality of Senders (a First Sender 705, a Second Sender, 710, . . . , M-th Sender) may send email messages to a Plurality of Recipients (a First Recipient 720, a Second Recipient 725, . . . , N-th Recipient). The messages may travel through Communication Links 735 and 740, a Routing Mail Server 715, and Communication Links 745 and 750. The Communication Links 735, 740, 745, and 750 are pathways for transmitting data over a computer network, such as the Internet.

Each Sender may send email messages from its geographical location. Each Recipient is associated with one or more geographical locations and may receive messages originating from associated geographical locations. The Routing Mail Server 715 may determine the geographical location for each Sender and route (forward, deliver) the email message to the corresponding Recipient. The Routing Mail Server 715 may determine the geographical location for the Sender from network addresses (e.g. IP addresses) in the headers of the email message.

Further the system may comprise a Routing Database 730 that is accessible by the Routing Mail Server 715 via data transmission pathways 755 and 760. The Routing Database 730 may store associations between geographical locations and network addresses (e.g. IP addresses or blocks of IP addresses). The Routing Mail Server 715 may obtain network address (e.g. IP address) from the header of the email message and find the corresponding geographical location for that network address in the Routing Database 730.

Further the Routing Database 730 may contain records associating each geographical location with a corresponding Recipient.

Alternatively, the Routing Database 730 may contain records associating network addresses (IP addresses or blocks of IP addresses) with corresponding Recipients. Thereby, alleviating the need for using geographical locations.

Figure 8:
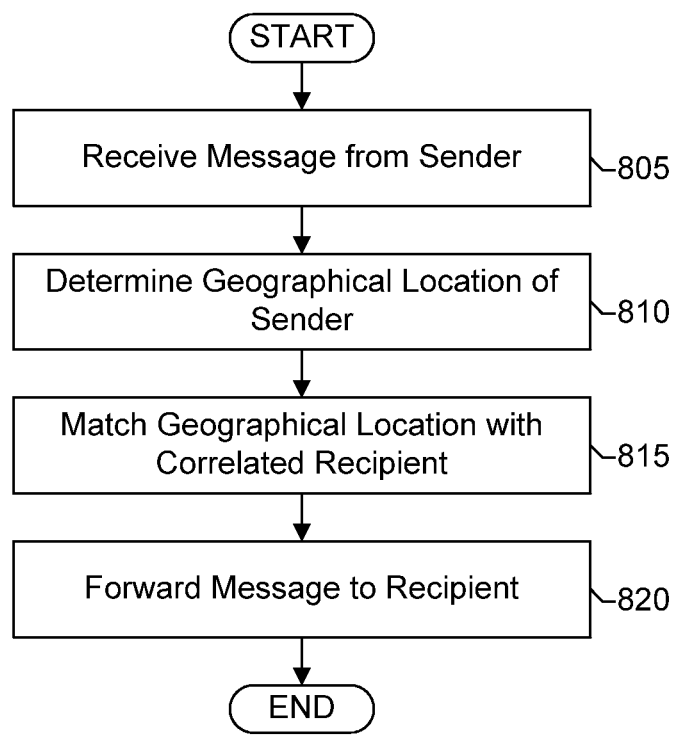
FIG. 8 represents a flowchart illustrating a method of using the system of FIG. 7.

FIG. 8 shows a sample method of using the system described in FIG. 7. A Sender may send an email message and a Routing Mail Server may receive it (Step 805). The Routing Mail Server may determine the geographical location of the Sender (Step 810). The Routing Mail Server may match the geographical location of the Sender with a corresponding Recipient (Step 815). The Routing Mail Server may forward the email message to the corresponding Recipient (Step 820).

In the systems and methods described above the geographical locations may mean a country, a territory, a state, a province, a county, a city or town, a precinct, a district, geographical coordinates (e.g. latitude and longitude), an area (e.g. latitude, longitude, and radius), network addresses or blocks of network addresses (e.g. IP addresses), etc.

Sharing of the domain name implies that multiple parties are sharing control or ownership of the domain name. Sharing of the domain name may take multiple forms, such as common ownership, partnership, cooperative, renting or leasing, etc.

U.S. patent application Ser. No. 11/090,442, "CREATION OF A DATABASE STORING DOMAIN NAMES AND BUSINESS OPERATIONAL AREAS" filed on Mar. 25, 2005 is hereby incorporated in its entirety by reference.

U.S. patent application Ser. No. 11/090,397, "USE OF A DATABASE STORING DOMAIN NAMES AND BUSINESS OPERATIONAL AREAS" filed on Mar. 25, 2005 is hereby incorporated in its entirety by reference.

U.S. Patent Application Publication No. 2004/0006597 A1 entitled "Method for domain name sharing," published on Jan. 8, 2004 is hereby incorporated in its entirety by reference.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The elements described in this specification and in the claims in plural form may also be construed as singular, unless specifically stated otherwise. The elements described in this specification and in the claims in singular form may also be construed as plural, unless specifically stated otherwise.

The Abstract accompanying this specification is provided to enable the United States Patent and Trademark Office and the public generally to determine quickly from a cursory inspection the nature and gist of the technical disclosure and is in no way intended for defining, determining, or limiting the present invention or any of its embodiments.

What is claimed is:

1. A system, comprising:
   one or more computer servers, configured:
   to assign a first set of one or more designated network addresses or a first set of one or more designated geographical locations to a first recipient,
   to assign a second set of one or more designated network addresses or a second set of one or more designated geographical locations to a second recipient,
   to intercept an email message sent by a sender,
   to determine a network address or a geographical location of said sender,
   to deliver said email message to said first recipient if said email message has originated from said first set of one or more designated network addresses or from said first set of one or more designated geographical locations, and
   to deliver said email message to said second recipient if said email message has originated from said second set of one or more designated network addresses or from said second set of one or more designated geographical locations,
   wherein said first recipient and said second recipient share a single email address associated with a single shared domain name and said email message was sent to said single email address.

2. The system of claim 1, wherein said geographical location of said sender, said first set of one or more designated geographical locations, or said second set of one or more designated geographical locations comprise latitude and longitude coordinates.

3. The system of claim 1, further comprising a database storing associations between geographical locations and network addresses.

4. The system of claim 1, further comprising a database storing associations between geographical locations and said first recipient and said second recipient.

5. The system of claim 1, further comprising a database storing associations between network addresses or blocks of network addresses and said first recipient and said second recipient.

6. A shared domain name electronic mail method, comprising the steps of:
   a) assigning a first set of one or more designated network addresses to a first recipient,
   b) assigning a second set of one or more designated network addresses to a second recipient,
   c) intercepting an email message sent by a sender,
   d) determining a network address of said sender,
   e) delivering said email message to said first recipient if said email message has originated from said first set of one or more designated network addresses, and
   f) delivering said email message to said second recipient if said email message has originated from said second set of one or more designated network addresses, wherein said first recipient and said second recipient share a single email address associated with a single shared domain name and said email message was sent to said single email address.

7. The method of claim 6, wherein at least one step of claim 6 is performed by a Routing Mail Server.

8. A shared domain name electronic mail method, comprising the steps of:
   a) assigning a first set of one or more designated geographical locations to a first recipient,
   b) assigning a second set of one or more designated geographical locations to a second recipient,
   c) intercepting an email message sent by a sender,
   d) determining a geographical location of said sender,
   e) delivering said email message to said first recipient if said email message has originated from said first set of one or more designated geographical locations, and
   f) delivering said email message to said second recipient if said email message has originated from said second set of one or more designated geographical locations, wherein said first recipient and said second recipient share a single email address associated with a single shared domain name and said email message was sent to said single email address.

9. The method of claim 8, wherein at least one step of claim 10 is performed by a Routing Mail Server.

10. The method of claim 8, wherein said geographical location of said sender, said first set of one or more designated geographical locations, or said second set of one or more designated geographical locations comprise latitude and longitude coordinates.

* * * * *